(12) United States Patent
Choo

(10) Patent No.: US 6,565,421 B1
(45) Date of Patent: May 20, 2003

(54) APPARATUS AND METHOD OF GRINDING LIQUID CRYSTAL CELL

(75) Inventor: Hun-Jun Choo, Kyoungsungbuk-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 57 days.

(21) Appl. No.: 09/654,058

(22) Filed: Sep. 1, 2000

(51) Int. Cl.⁷ .............................. B24B 1/00; B24B 7/00; B24B 9/00
(52) U.S. Cl. .............................. 451/41; 451/44; 451/58; 451/65; 451/66
(58) Field of Search .............................. 451/41, 44, 57, 451/58, 65, 66; 438/692, 693

(56) References Cited

U.S. PATENT DOCUMENTS

| | | | |
|---|---|---|---|
| 4,179,851 A | * 12/1979 | Neisler et al. | ............... 451/240 |
| 4,286,415 A | * 9/1981 | Loreto | ........................ 451/43 |
| 5,410,843 A | * 5/1995 | Gottschald | ................. 451/43 |
| 5,658,189 A | * 8/1997 | Kagamida | ................... 451/66 |
| 5,783,289 A | 7/1998 | Suzuki et al. | |
| 6,010,384 A | 1/2000 | Nishino et al. | |
| 6,306,015 B1 | * 10/2001 | Bushell | ....................... 451/144 |
| 6,325,704 B1 | * 12/2001 | Brown et al. | .................. 451/44 |

FOREIGN PATENT DOCUMENTS

JP          64-20958     * 1/1989

* cited by examiner

*Primary Examiner*—Timothy V. Eley
(74) *Attorney, Agent, or Firm*—Birch, Stewart, Kolasch & Birch, LLP

(57) ABSTRACT

The present invention discloses an apparatus for grinding a liquid crystal cell including a power unit; a first axis receiving a rotational motion from the power unit; a second axis extending from the first axis and rotating along with the first axis; a first grinding wheel having a first grinding surface and being arranged between the first and second axes, the first grinding surface having a first inclined angle; and a second grinding wheel having second and third grinding surfaces and being arranged at a terminal portion of the second axis, the second grinding surface having a second inclined angle, and the third grinding surface having a third inclined angle.

18 Claims, 6 Drawing Sheets

APPARATUS AND METHOD OF GRINDING LIQUID CRYSTAL CELL

CROSS REFERENCE

This application claims the benefit of Korean Patent Application No. 1999-36859, filed on Sep. 1, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to an apparatus and a method of grinding a liquid crystal cell.

2. Description of the Related Art

In general, a LCD device includes a lower substrate having a thin film transistor and an upper substrate having a color filter with a liquid crystal layer interposed therebetween. A simplified manufacturing process of the liquid crystal cell is as follows. A common electrode and a pixel electrode are formed on the upper substrate and on the lower substrate, respectively. Then, the two substrates are arranged to face each other, and sealed with a sealant, thereby forming a gap between the two substrates. A liquid crystal is injected into the gap between the two substrates. Upper and lower polarizers are arranged on outer surfaces of the upper and lower substrates, respectively.

Applying voltages to the common electrode and the pixel electrode, a transmitting amount of light is controlled and a character or an image is displayed due to a light shutter effect.

A manufacturing process of the liquid crystal cell is simple in comparison to manufacturing processes of the thin film transistors and color filters. The manufacturing process of a liquid crystal cell includes the steps of forming an orientation film, forming a cell gap, and cutting a cell.

The manufacturing process of the LCD device described above is explained in detail hereinafter with reference to the accompanying drawings.

FIG. 1 is a flow chart illustrating the manufacturing process of the LCD device. As shown in FIG. 1, first the lower substrate is prepared (step 1). On the lower substrate, a plurality of thin film transistors and pixel electrodes are arranged in a one-to-one relationship. To form the orientation film on the lower substrate, the surface of the lower substrate is coated with an organic film such as a polyimide, and the orientation film is rubbed in a direction (step 2). It is desirable that the orientation film is formed to keep a uniform thickness of the whole surface over the lower substrate. The rubbing is performed normally by using a cloth. Aligned on the orientation film, the liquid crystals orient themselves uniformly in the direction of the rubbing. By the rubbing treatment of the orientation film, liquid crystals can be driven normally, and uniform display characteristics can be obtained. Then, sealant is applied in a picture-frame-like pattern, either by means of screen-printing or dispensing (step 3). Sealant is required in order to make a liquid crystal cell from the two substrates. In addition to sealing the liquid crystal, sealant protects the liquid crystal from contamination from external sources such as the penetration of water, and from environmental changes. Next, spacers are sprayed to keep a uniform cell gap between the lower and upper substrates (step 4). It is an important requirement to perform the spraying uniformly over the entire substrate, thereby controlling the spacer density (number of spacers per unit area), and preventing the formation of lumps. The spraying technique includes a wet method of spraying spacers and a dry method of spraying spacers. The wet method of spraying spacers involves the following steps: diffusing spacers in a low-boilingpoint organic solvents, such as freon or alcohol, through the use of ultrasonic waves; spraying the spacer-diffused liquid; and drying the panel in order to evaporate the solvent. In the dry method, spacers are applied electrostatically, or diffused by means of an air-jet. When TFT-LCDs are handled, measures should be taken to prevent a buildup of static electricity. In addition, fren, alcohol, and other organic solvents are subject to density control. Because of this, the dry or air-jet diffusion method is mainly used. Sequentially, two substrates are assembled with and attached to each other (step 5). Alignment of the two substrates depends on an alignment error, which are several micrometers. When the two substrates are aligned with each other beyond the alignment error, since light leakage may occur, desirable display characteristics cannot be obtained. The next step is a cell-cutting process (step 6). The liquid crystal cell manufactured through the foregoing five steps is cut into unit cells. The liquid crystal cell undergoes the cell-cutting process after a plurality of liquid crystal cells is formed on the large-sized glass substrate. The cell-cutting process includes a scribing process that forms a cutting line on a surface of the substrate with a pen of a diamond having a higher hardness than the glass substrate, and a breaking process that breaks the liquid crystal cell into unit cells. Then, a liquid crystal is injected into the cell gap between the two substrates (step 7). The unit liquid crystal cell generally has an area of hundreds of CLIENT INPUT NEEDED and a gap of several micrometers (CLIENT INPUT NEEDED). A vacuum injecting method, which uses a pressure difference between inside and outside of the cell fills the liquid crystal between the two substrates.

As shown in FIG. 2A, a cut potion "A" of the unit liquid crystal cell is so sharp that workers may receive injuries in subsequent processing. Therefore, the cut portion "A" should be ground. In other words, as shown in FIG. 2B, the cut portion "A" needs to be ground in order to make upper and lower surfaces 10 and 12 have a predetermined inclined angle.

FIGS. 3A and 3B show a conventional method of grinding the liquid crystal cell. As shown in FIG. 3A, a conventional apparatus of grinding the liquid crystal cell includes a rotation axis 50 and a grinding wheel 52 mounted to the rotation axis 50. Also, FIG. 3B shows a grinding method of the lower edges of the liquid crystal cell. In the convention method of grinding the cut portion of the liquid crystal cell, upper and lower edges of the cut portion "A" are separately ground. However, since such a grinding method grinds the upper and lower edges of the cut potion of the liquid crystal cell, respectively, it has a disadvantage in that the processing time is long.

For the foregoing reason, there is a need for an apparatus for grinding the liquid crystal cell and having a short processing time.

SUMMARY OF THE INVENTION

To overcome the problems described above, preferred embodiments of the present invention provide an apparatus and a method of grinding a liquid crystal cell during a short processing time.

In order to achieve the above object, a preferred embodiment of the present invention provides an apparatus for grinding a liquid crystal cell comprising a power unit; a first axis receiving a rotational motion from the power unit; a second axis extending from the first axis and rotating along with the first axis; a first grinding wheel having a first grinding surface and being arranged between the first and second axes, the first grinding surface having a first inclined angle; and a second grinding wheel having second and third grinding surfaces and being arranged at a terminal portion of the second axis, the second grinding surface having a second inclined angle, and the third grinding surface having a third inclined angle.

The first and second grinding wheels have a substantially circular shape. A distance between the first and second grinding wheels is controllable. Rotation speeds of the first and second axes are substantially equal. The first and second inclined angles are about 30 degrees. The third inclined angle is between approximately 80 degrees and 90 degrees.

The preferred embodiment of the present invention, in another aspect, further provides a method of grinding a liquid crystal cell including: providing a grinding apparatus on at least one corner of the liquid crystal cell, the grinding apparatus including a first wheel and a second wheel; grinding the corner of the liquid crystal cell; inserting the liquid crystal cell between the first wheel and the second wheel, the liquid crystal cell having at least one cut portion; and grinding the cut portion of the liquid crystal cell.

The step of grinding the cut portion includes grinding the upper and lower edges of the cut portion simultaneously.

By using the grinding apparatus according to the preferred embodiment of the present invention, since the upper and lower edges of the cut portion of the liquid crystal cell are ground simultaneously, the processing time can be reduced remarkably.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, examples of which are illustrated in the accompanying drawings.

Figure 1:
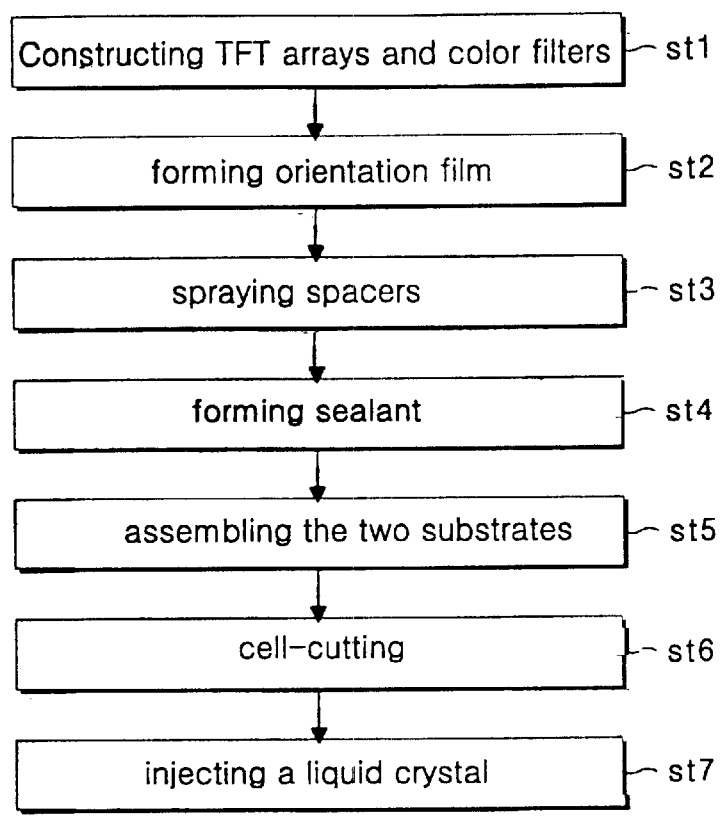
FIG. 1 is a flow chart illustrating a manufacturing process of a liquid crystal display device.
Figure 2A:
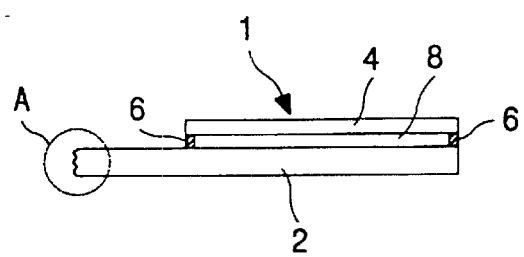
FIG. 2 is a perspective view illustrating a typical unit liquid crystal cell.
Figure 2B:
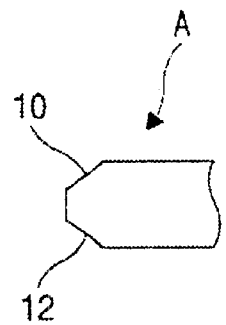
Figure 3A:
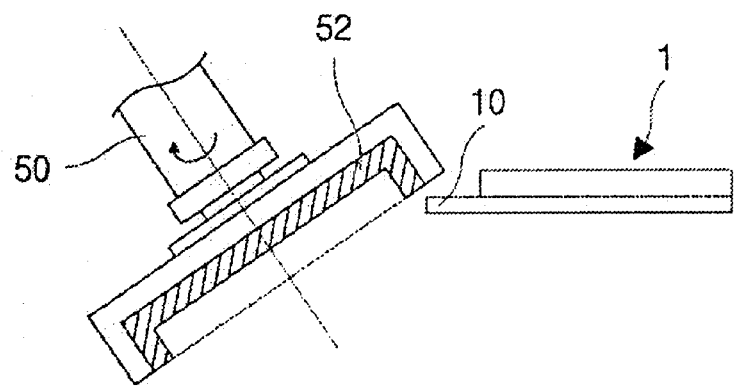
FIGS. 3A and 3B show a conventional method of grinding the unit liquid crystal cell.
Figure 3B:
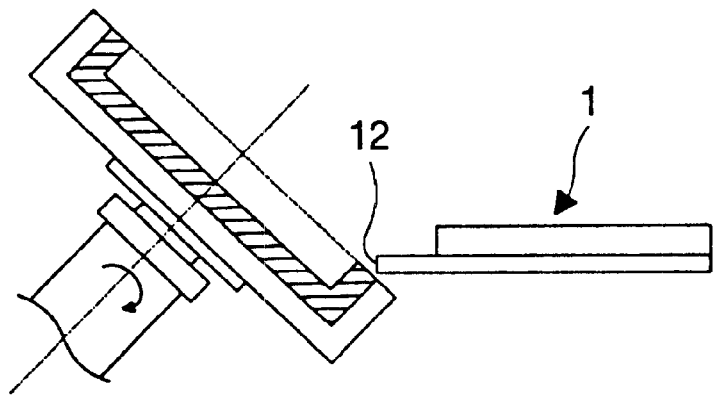
Figure 4:
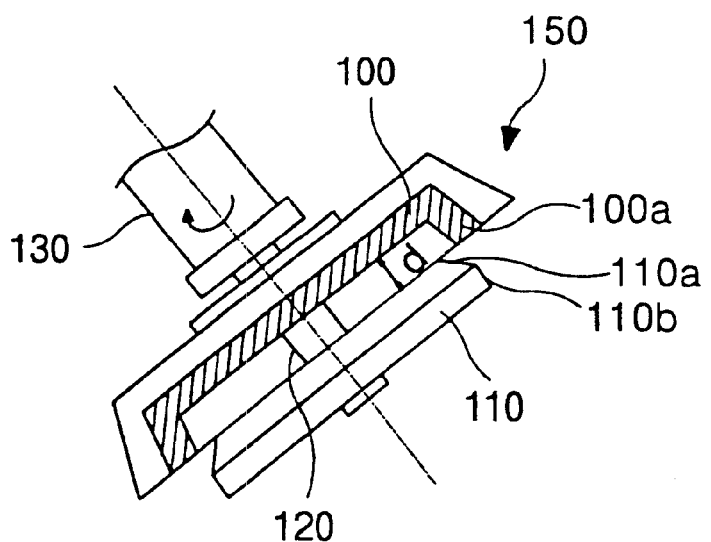
FIG. 4 is a perspective view illustrating an apparatus of grinding a unit liquid crystal cell according to a preferred embodiment of the present invention.

FIG. 4 shows an apparatus for grinding a unit liquid crystal cell according to a preferred embodiment of the present invention. As shown in FIG. 4, the grinding apparatus 150 includes a main axis 130 and a rotation axis 120. The rotation axis 120 extends from the main axis 130 and rotates in the same direction as the main axis 130. The grinding apparatus 150 further includes upper and lower wheels 100 and 110. The upper wheel 100 is arranged between the main axis 130 and the rotation axis 120, and the lower wheel 110 is mounted to a terminal portion of the rotation axis 120. The main axis 130 is associated with a power unit (not shown) that carries out a rotational motion, and so it serves to transmit a rotational motion to the rotation axis 120. The rotation axis 120 further serves to transmit a torque from the main axis 130 to the upper and lower wheels 100 and 110, fixing them. The upper and lower wheels 100 and 110 are called a grindstone and have a substantially circular shape. Since the grindstone grinds substantially a glass substrate, it is made of a material having a higher hardness than glass, for example, a natural material such as emery, quartz, diatomite and the like or an artificial material such as silundum, aluminum oxide, iron oxide, chromium oxides and the like. The upper and lower wheels 100 and 110 have the same rotation speed, and a distance "d" between the upper and lower wheels 100 and 110 is controllable. The upper wheel 100 has a first grinding surface 100a, which is inclined. An inclined angle of the first grinding surface 100a is preferably about 30 degrees. The lower wheel 110 has second and third grinding surfaces 110a and 110b. The second grinding surface 110a preferably has an inclined angle of about 30 degrees, and the third grinding surface 110b preferably has inclined angles between about 80 degrees and 90 degrees. The first grinding surface 100a of the upper wheel 100 and the second grinding surface 110a of the lower wheel 110 are used to simultaneously grind upper and lower edges 10 and 12 (see FIG. 6) of the cut portion "A" (see FIG. 5) of the liquid crystal cell, respectively. In other words, the two facing grinding surfaces 100a and 110a form an angle suitable to smoothly grind the cut portion "A" of the liquid crystal cell. The third grinding surface of the lower wheel 110 is used to grind corners 200a, 200b, 200c and 200d (see FIG. 7A) of the liquid crystal cell. The reason that the corners of the liquid crystal cell are ground is that their ends may be broken. Therefore, it is desirable that the four corners are ground to prevent the liquid crystal cell from being broken.

Figure 5:
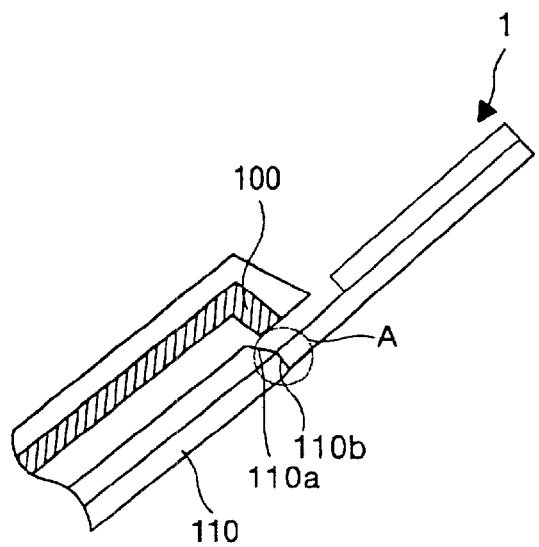
FIG. 5 shows a method of grinding corners of the liquid crystal cell according to the preferred embodiment of the present invention.
Figure 6:
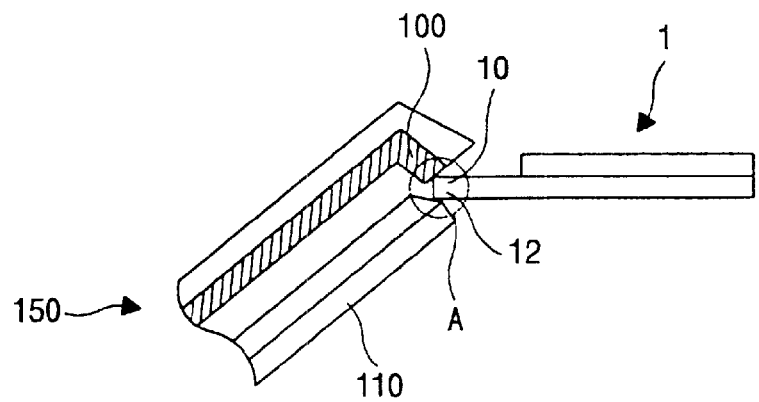
FIG. 6 shows a method of grinding a cut portion of the liquid crystal cell according to the preferred embodiment of the present invention.

FIG. 5 shows a method of grinding corners of the liquid crystal cell, and FIG. 6 shows a method of simultaneously grinding upper and lower edges of the cut portion "A" of the liquid crystal cell. In general, the corners of the liquid crystal cell are ground before the edge of the cut portion is ground. Further, one or more grinding apparatuses may be used to grind the liquid crystal cell. In case of the rectangular shaped liquid crystal cell, it is preferable that two grinding apparatus are used.

Figure 7A:
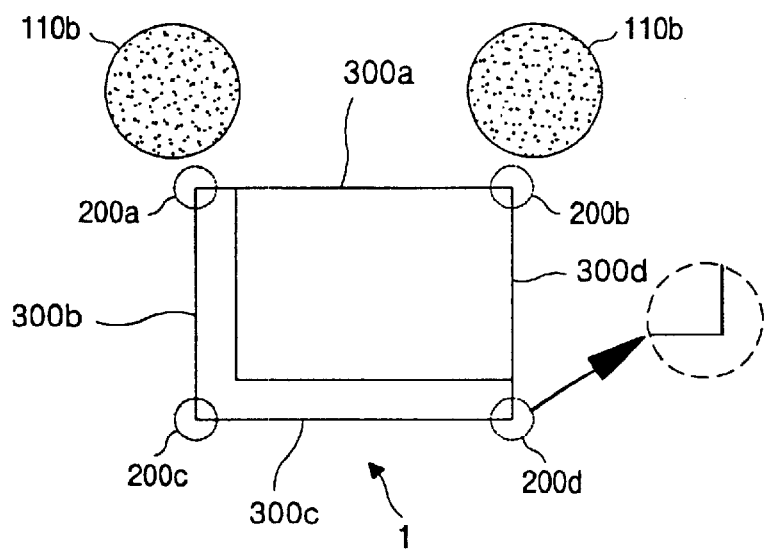
FIGS. 7A and 7B show a method of the liquid crystal cell using the two grinding apparatus according to the preferred embodiment of the present invention.
Figure 7B:
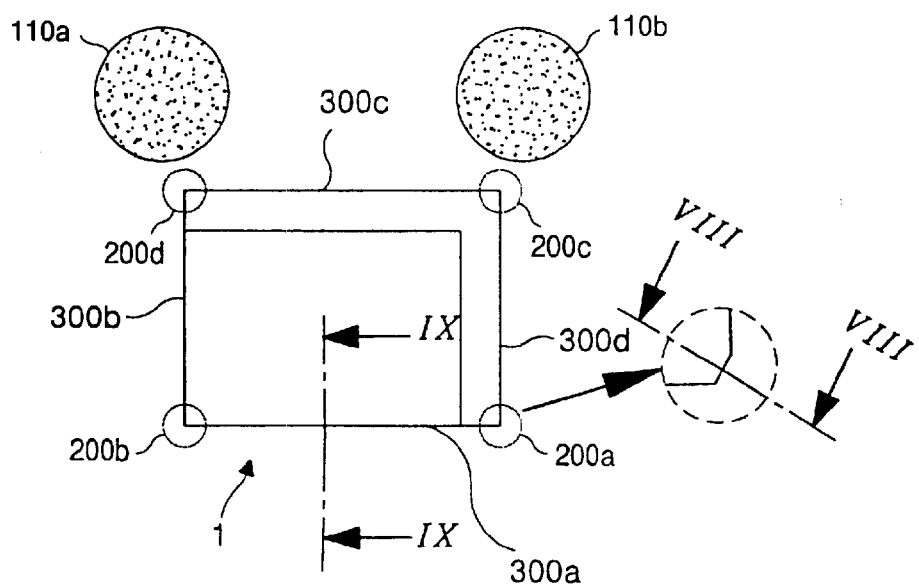

FIGS. 7A and 7B show a method of grinding the liquid crystal cell using the two grinding apparatuses according to a preferred embodiment of the present invention. As shown in FIGS. 5 and 7A, the two grinding apparatuses are located near the two adjacent corners 200a and 200b, and the third grinding surface 110b grinds the corners 200a and 200b when the grinding apparatus is operated, whereby the corners 200a and 200b become round. On completing the grinding of the two corners 200a and 200b, as shown in FIG. 6, the cut portion "A" of the liquid crystal cell 1 is inserted between the first grinding surface 100a of the upper wheel 100 and the second grinding surface 110a of the lower wheel 110. Moving forward, the grinding apparatus 150 grinds the upper and lower edges 10 and 12 of the cut portion "A" of the liquid crystal cell 1. At this point, the upper and lower edges 10 and 12 of the cut portion "A" are simultaneously ground. When the cut portions "A" of two sides 300a and 300b of the liquid crystal cell 1 are ground, as shown in FIG. 7B, the liquid crystal cell 1 is rotated in a 90-degree arc. Sequentially, the remaining two corners 200c and 200d are ground by the third grinding surface 110b of the lower wheel 110, and then the remaining two sides 300c and 300d are also ground in the same manner.

Figure 8:
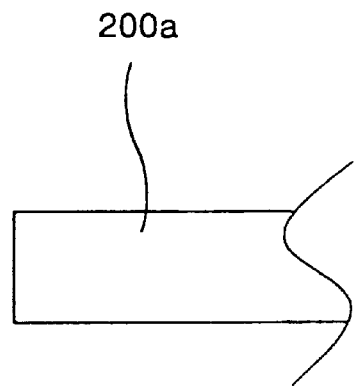
FIG. 8 is a cross sectional view taken along line VIII—VIII of FIG. 7B.

FIG. 8 is a cross sectional view taken along line VIII—VIII of FIG. 7B, illustrating the ground corner 200a. As shown in FIG. 8, the corner 200a becomes round horizontally, but is not inclined vertically.

Figure 9:
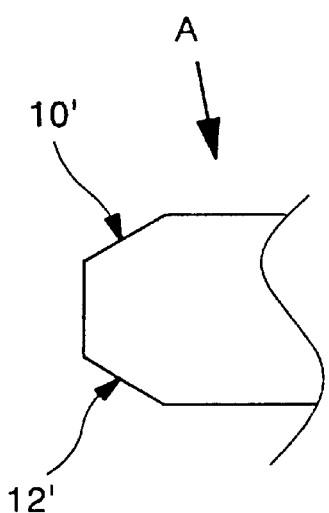
FIG. 9 is a cross sectional view taken along line IX—IX of FIG. 7B.

FIG. 9 is a cross sectional view taken along line IX—IX of FIG. 7B, illustrating the ground cut portion "A". As shown in FIG. 9, the ground upper and lower edges 10' and 12' has an incident angle, which corresponds to the incident angle of the first and second grinding surfaces 100a and 110a, respectively.

As described herein above, by using the grinding apparatus according to the preferred embodiment of the present invention, since the upper and lower edges of the cut potion of the liquid crystal cell are ground simultaneously, the processing time can be reduced remarkably.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of grinding a liquid crystal cell comprising:
   providing a grinding apparatus on at least one corner of the liquid crystal cell, the grinding apparatus including a first wheel and a second wheel;
   grinding the at least one corner of the liquid crystal cell;
   inserting the liquid crystal cell between the first wheel and the second wheel, the liquid crystal cell having at least one cut portion; and
   grinding the at least one cut portion of the liquid crystal cell.

2. The method of claim 1, wherein the step of grinding the cut portion includes grinding upper and lower edges of the cut portion simultaneously.

3. The method of claim 1, wherein the first and second grinding wheels each have a substantially circular shape.

4. The method of claim 1, further comprising the step of controlling a distance between the first and second grinding wheels.

5. The method of claim 1, wherein a first axis receives rotational motion from the power unit and a second axis extends from the first axis and rotates along with the first axis, the rotation speeds of the first and second axes being substantially equal.

6. The method of claim 1, wherein the first grinding wheel has a first inclined angle and the second grinding wheel has a second inclined angle, the first and second inclined angles including angles measuring substantially 30 degrees.

7. The method of claim 1, wherein the third grinding wheel has a third inclined angle, the third inclined angle including an angle measuring between 80 degrees and 90 degrees.

8. The method of claim 1, wherein the first grinding wheel has a first grinding surface and the second grinding wheel has a second grinding surface, further comprising the step of grinding cut portions of the liquid crystal cell by the first and second grinding surfaces.

9. The method of claim 1, wherein the third grinding wheel has a third grinding surface, further comprising the step of grinding corners of the liquid crystal cell by the third grinding surface.

10. The method of claim 1, wherein the first grinding wheel has a first grinding surface and the second grinding wheel has a second grinding surface, wherein the second grinding surface faces the first grinding surface.

11. An apparatus for grinding a liquid crystal cell, comprising:
    a power unit;
    a first axis receiving rotational motion from the power unit;
    a second axis extending from the first axis and rotating along with the first axis;
    a first grinding wheel having a first grinding surface and being arranged between the first and second axes, the first grinding surface having a first inclined angle for grinding a first portion of a liquid crystal cell by rotational motion of said grinding wheel; and
    a second grinding wheel having second and third grinding surfaces and being arranged at a terminal portion of the second axis, the second grinding surface having a second inclined angle for grinding a second portion of a liquid crystal cell at the same time as said first portion is being ground, and the third grinding surface having a third inclined angle, wherein a distance between said first and second grinding wheels is variable according to a thickness of a liquid crystal cell.

12. The apparatus of claim 11, wherein the first and second grinding wheels each have a substantially circular shape.

13. The apparatus of claim 11, wherein rotation speeds of the first and second axes are substantially equal.

14. The apparatus of claim 11, wherein the first and second inclined angles include angles measuring substantially 30 degrees.

15. The apparatus of claim 11, wherein the third inclined angle includes an angle measuring between 80 degrees and 90 degrees.

16. The apparatus of claim 11, wherein the first and second grinding surfaces grind cut portions of the liquid crystal cell.

17. The apparatus of claim 11, wherein the third grinding surface grinds corners of the liquid crystal cell.

18. The apparatus of claim 11, wherein the second grinding surface faces the first grinding surface.

* * * * *